United States Patent
Watanabe

(10) Patent No.: US 8,205,944 B2
(45) Date of Patent: Jun. 26, 2012

(54) ARRANGEMENT LEVER DEVICE FOR AUTOMOBILE SEAT

(75) Inventor: Masato Watanabe, Tochigi (JP)

(73) Assignee: TS TECH Co., Ltd., Saitama (JP)

( * ) Notice: Subject to any disclaimer, the term of this patent is extended or adjusted under 35 U.S.C. 154(b) by 0 days.

(21) Appl. No.: 13/272,576

(22) Filed: Oct. 13, 2011

(65) Prior Publication Data

US 2012/0025581 A1 Feb. 2, 2012

Related U.S. Application Data

(63) Continuation of application No. 12/441,820, filed on May 29, 2009.

(30) Foreign Application Priority Data

Sep. 19, 2006 (JP) .................................. 2006-252754

(51) Int. Cl.
  *B60N 2/06* (2006.01)
(52) U.S. Cl. ....................................................... 297/341
(58) Field of Classification Search .................. 297/341, 297/344.1, 378.12
  See application file for complete search history.

(56) References Cited

U.S. PATENT DOCUMENTS

| | | | |
|---|---|---|---|
| 4,382,630 A * | 5/1983 | Weston | 297/362 |
| 4,822,101 A * | 4/1989 | Hosoe | 297/378.12 |
| 5,393,116 A * | 2/1995 | Bolsworth et al. | 296/65.03 |
| 5,863,098 A * | 1/1999 | Kojima et al. | 297/344.15 |
| 6,152,533 A * | 11/2000 | Smuk | 297/341 |
| 6,739,668 B2 * | 5/2004 | Coman et al. | 297/378.12 |
| 7,328,954 B2 * | 2/2008 | Sasaki et al. | 297/378.12 |
| 7,562,926 B2 * | 7/2009 | Kojima | 296/65.13 |
| 2004/0113477 A1 * | 6/2004 | Kojima | 297/378.1 |

* cited by examiner

*Primary Examiner* — Peter R. Brown
(74) *Attorney, Agent, or Firm* — Dann, Dorfman, Herrell and Skillman, P.C.

(57) ABSTRACT

An arrangement lever device for an automobile seat including a reclining operation lever (1) mounted on a support shaft that is concentrically joined with an actuating shaft (5) interconnecting reclining lock mechanisms which are arranged between brackets (3) of a seat cushion and brackets (4) of a seat back, a walk-in operation lever (2) arranged to be adjacent to the reclining operation lever (1) and supported on one of the brackets (3) of the seat cushion, and a linkage mechanism for preventing the motion of one of the levers (1, 2) from being transmitted to the other of the levers (1, 2), the linkage mechanism coupled between the levers (1, 2).

7 Claims, 6 Drawing Sheets

ARRANGEMENT LEVER DEVICE FOR AUTOMOBILE SEAT

This application is a continuation of U.S. application Ser. No. 12/441,820, filed on May 29, 2009, the entirety of which is incorporated herein by reference.

TECHNICAL FIELD

The present invention relates to an arrangement lever device for an automobile seat, the arrangement lever device including a reclining operation lever and a walk-in operation lever.

BACKGROUND ART

There has been known an automobile seat which includes a seat cushion, a seat back pivotally supported on the seat cushion via first and second reclining lock means, a reclining operation lever for unlocking the reclining lock means to allow the seat back to be angularly adjusted and pivoted forward and rearward, a slide rail mechanism for allowing the automobile seat to be slid forward and rearward, a slide lock means for the slide rail mechanism, and a walk-in operation lever for unlocking the reclining lock means to allow the seat back to be inclined forward and for unlocking the slide lock mechanism.

Generally, the reclining operation lever is mounted on a support shaft that is concentrically joined with an actuating shaft interconnecting the first and second reclining lock means that are arranged between brackets of the seat cushion and brackets of the seat back. The walk-in operation lever is provided on an upper portion of the sea back of a front seat in order that an occupant sitting on a rear seat can handle the walk-in operation lever (Japanese Patent Application Laid-Open No. 2005-22557).

In the automobile seat disclosed in Japanese Patent Application Laid-Open No. 2005-22557, the reclining operation lever and the walk-in operation lever are arranged at completely different positions, so that a person is hard to judge how to arrange the automobile seat by any of the levers.

Moreover, there has been proposed an automobile seat in which a reclining operation lever is mounted on a support shaft that is concentrically joined with an actuating shaft interconnecting first and second reclining lock means that are arranged between brackets of a seat cushion and brackets of a seat back, and a walk-in operation lever is also mounted on the support shaft that is concentrically joined with the actuating shaft of the reclining lock means (Japanese Patent Application Laid-Open No. 2001-121994).

In the automobile seat disclosed in Japanese Patent Application Laid-Open No. 2001-121994, both the reclining operation lever and the walk-in operation lever are mounted on the support shaft, so that there is inconvenience in which when any one of the reclining operation lever and the walk-in operation lever is operated by the person, the other of the levers is swingingly moved according to the operation of the one of the levers.

SUMMARY OF THE INVENTION

It is therefore an object of the present invention is to provide an arrangement lever device for an automobile seat, which includes a reclining operation lever and a walk-in operation lever which are arranged to be adjacent to each other in order that a person can easily find these levers, in which operation of one of the levers is not transmitted to the other of the levers with a simple mechanism, that is, when one of the levers is operated by the person, the other of the levers that is in an unused state is not swingingly moved according to the operation of the one of the levers, and which is convenient to be handled.

It is another object of the present invention is to provide an arrangement lever device for an automobile seat, in which respective elements making up the arrangement lever device can be smoothly actuated for predetermined purposes.

In accordance with the present invention, there is provided an arrangement lever device for an automobile seat. The automobile seat includes a seat cushion having a pair of spaced apart brackets, a seat cushion having a pair of spaced apart brackets and pivotally supported to the seat cushion via first and second reclining lock means arranged between the brackets of the seat cushion and the brackets of the seat back, an actuating shaft for actuating the first and second lock means, the actuating shaft interconnecting the first and second locking means, a slide rail mechanism for allowing the automobile seat to be slid in a vehicle body, and slide lock means for locking the slide rail mechanism and preventing the slide movement of the automobile seat. The arrangement lever device comprises a reclining operation lever for unlocking the first and second reclining lock means to allow the seat back to be angularly adjusted and pivoted forward and rearward relative to the seat cushion, the reclining operation lever being mounted on a support shaft that is concentrically joined with the actuating shaft, a walk-in operation lever for unlocking the first and second reclining lock means to allow the seat back to be inclined forward and for unlocking the slide lock means for the slide rail mechanism, the walk-in operation lever being arranged to be adjacent to the reclining operation lever and pivotally supported on one of the brackets of the seat cushion, and a linkage mechanism for preventing the motion of one of the reclining operation and walk-in operation levers from being transmitted to the other of the levers, the linkage mechanism being coupled between the reclining operation lever and the walk-in operation lever.

In the arrangement lever device for the automobile seat, the reclining operation lever is mounted to the support shaft that is concentrically joined with the actuating shaft interconnecting the reclining lock means that are arranged between the brackets of the seat cushion and the bracket of the seat back, and the walk-in operation lever is arranged to be adjacent to the reclining operation lever and is pivotally supported on the bracket of the seat cushion, so that the reclining operation lever and the walk-in operation lever become easy to be found.

Moreover, the linkage mechanism for preventing the motion of one of the levers from being transmitted to the other of the levers is coupled between the levers, so that with the simple linkage mechanism, one of the levers which is in the unused state is prevented from being swingingly moved according to the operation of the other lever in the used state and the operation of the other lever in the used state is not interrupted with the lever in the unused state, thus providing the arrangement lever device that is convenient to be handled.

In a preferred embodiment of the present invention, the walk-in operation lever is provided at a rearward end portion thereof with a standing pin, and the linkage mechanism includes a first swinging bar supported by the actuating shaft, a link bracket supported on the support shaft, a second swinging arm pivotally supported on the bracket of the seat cushion and coupled to the slide lock means for the slide rail mechanism via a wire cable, the second swinging arm being provided at an upper end portion thereof with an induction pin, a first link plate having an elongated hole formed in a lower end portion thereof, the first link plate being coupled at an upper end portion thereof to the first swinging arm with the elongated hole thereof receiving the standing pin of the walk-in operation lever, so that the first link plate is coupled between the first swinging arm and the walk-in operation lever, and a second link plate coupled at an upper end portion thereof to the link bracket and coupled at a lower end portion thereof to the induction pin of the second swinging arm, so that the second link plate is coupled between the link bracket and the second swinging arm. When the reclining operation lever is operated, the actuating shaft is rotated to thereby cause the first and second reclining lock means to be unlocked, the first swinging arm is swung to thereby cause the first link plate to be moved relative to the walk-in operation lever while allowing the elongated hole thereof to be shifted relative to the standing pin of the walk-in operation lever, and the second link plate is moved to thereby cause the second swinging lever to be pivoted in a direction in which the wire cable is not pulled, so that the operation of the reclining operation lever is idled by the movement of the first link plate relative to the walk-in operation lever while allowing the elongated hole thereof to be shifted relative to the standing pin of the walk-in operation lever, and is not transmitted to the walk-in operation lever.

In the arrangement lever device for the automobile seat, by the operation of the reclining operation lever, the actuating shaft is rotated to thereby cause the first and second reclining lock means to be unlocked, the first swinging arm is swung to thereby cause the first link plate to be moved relative to the walk-in operation lever while allowing the elongated hole thereof to be shifted relative to the standing pin of the walk-in operation lever, and the second link plate is moved to thereby cause the second swinging lever to be pivoted in a direction in which the wire cable is not pulled, so that the operation of the reclining operation lever is idled by the movement of the first link plate relative to the walk-in operation lever while allowing the elongated hole thereof to be shifted relative to the standing pin of the walk-in operation lever, and is not transmitted to the walk-in operation lever.

In a preferred embodiment of the present invention, the linkage mechanism further includes a third link plate having a laterally extending hole formed in one end portion thereof, the third link plate being coupled at the other end portion to the first swinging arm with the laterally extending hole thereof receiving the induction pin of the second swinging arm, so that the third link plate is coupled between the first swinging arm and the second swinging arm. When the walk-in operation lever is operated, the first link plate is pulled downward to thereby cause the first swinging arm to be swung while allowing the third link plate to be moved in such a manner that the laterally extending hole thereof is shifted relative to the induction pin of the second swinging arm, and the second swinging arm is swung in a direction in which the wire cable is pulled, so that the operation of the walk-in operation lever is idled by the movement of the third link plate in such a manner that the laterally extending hole thereof is shifted relative to the induction pin of the second swinging arm, and is not transmitted to the reclining operation lever.

In the arrangement lever device for the automobile seat, by the operation of the walk-in operation lever, the first link plate is pulled downward to thereby cause the first swinging arm to be swung while allowing the third link plate to be moved in such a manner that the laterally extending hole thereof is shifted relative to the induction pin of the second swinging arm, and the second swinging arm is swung in a direction in which the wire cable is pulled, so that the operation of the walk-in operation lever is idled by the movement of the third link plate in such a manner that the laterally extending hole thereof is shifted relative to the induction pin of the second swinging arm, and is not transmitted to the reclining operation lever.

In a preferred embodiment of the present invention, the linkage mechanism further includes a retaining bracket for supporting the link bracket, the retaining bracket having a circular arc-shaped hole concentric with the actuating shaft, and the retaining bracket being mounted on the support shaft and mounted to the bracket of the seat cushion. The link bracket is provided with a protruding piece extending perpendicularly thereto, and is pivotally supported on the support shaft with the protruding piece thereof being inserted through the circular arc-shaped hole of the retaining bracket. A return coil spring is stretched between the link bracket and the retaining bracket, so that the reclining operation lever is urged by the return coil spring so as to be returned to its original position after the reclining operation lever is released from the operated condition thereof.

In the arrangement lever device for the automobile seat, the link bracket is combined with the retaining bracket so as to be pivoted relative to the retaining bracket, with the protruding piece thereof being inserted through the circular arc-shaped hole of the retaining bracket, so that the second link plate coupled to the link bracket can be stably and smoothly operated by the link bracket, and the second swinging arm can be also stably and smoothly operated by the second link plate.

Moreover, the return coil spring is stretched between the link bracket and the retaining bracket, whereby the reclining operation lever is adapted to be returned to its original position by the return coil spring after the reclining operation lever is released from the operated state, thus making it possible to provide the reclining operation lever that is convenient to be handled.

In a preferred embodiment of the present invention, the bracket of the seat cushion has a substantially L-shaped guide hole for guiding the induction pin of the second swinging arm, and a support pin provided thereon, and the second swinging arm has a vertically extending hole, the second swinging arm being pivotally supported on the bracket with the induction pin thereof being inserted through the substantially L-shaped guide hole of the bracket of the seat back and with the vertically extending hole thereof receiving the support pin of the bracket of the seat cushion, and the second swinging arm being adapted to be located relative to the bracket of the seat cushion at an initial state in such a manner that the induction pin thereof is located at a middle bent-portion of the substantially L-shaped guide hole of the bracket of the seat cushion and a lower end portion of the vertically extending hole thereof is abutted against the support pin of the bracket of the seat cushion. When the reclining operation lever and the walk-in operation lever are operated, the second swinging arm is swung forward and rearward while being guided along the substantially L-shaped guide hole of the bracket of the seat cushion.

In the arrangement lever device for the automobile seat, the bracket 3 of the seat cushion has the substantially L-shaped guide hole through which the induction pin of the second swinging arm is inserted and which allows the second swinging arm to be swung forward and rearward while allowing the induction pin thereof being guided along the guide hole of the bracket of the seat cushion, so that the second swinging arm can be stably swung on the bracket of the seat cushion, and the slide lock means for the slide rail mechanism can be smoothly unlocked by the wire cable which is pulled by the smooth swinging movement of the second swinging arm.

Moreover, the second swinging arm has the vertically extending hole, the support pin for supporting the second swinging arm so as to allow the second swinging arm to be pivoted is provided on the bracket of the seat cushion, and the second swinging arm is arranged with the vertically extending hole thereof receiving the support pin of the bracket and with the induction pin thereof being inserted through the substantially L-shaped guide hole of the bracket of the seat cushion. At the initial state, the second swinging arm is located with respect to the bracket of the seat cushion with the induction pin thereof being located at the middle bent-portion of the substantially L-shaped guide hole of the bracket and with the lower end portion of the vertically extending hole thereof being abutted against the support pin of the bracket of the seat cushion. Therefore, when the levers are operated, the second swinging arm can be positively and smoothly swung in the forward/rearward direction while being guided by the substantially L-shaped guide hole of the bracket of the seat cushion and supported by the support pin of the bracket of the seat cushion.

DETAILED DESCRIPTION OF THE PREFERRED EMBODIMENT

An arrangement lever device for an automobile seat according to a preferred embodiment of the present invention will be discussed hereinafter with reference to the accompanying drawings. Incidentally, the term "forward" and the term "rearward" which are hereinafter referred to shall be used on the basis of a forward direction in a vehicle body and a rearward direction in the vehicle body, respectively.

Figure 1:
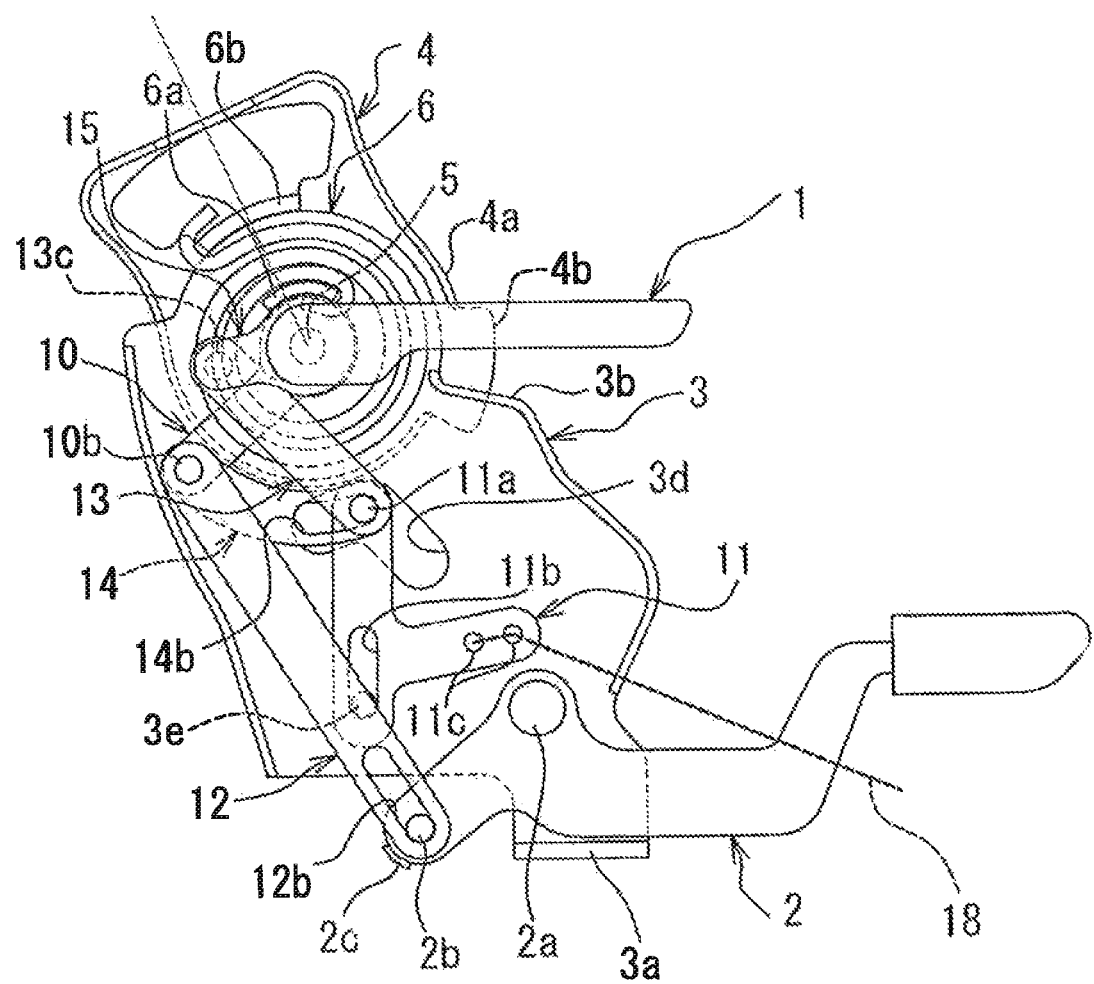
FIG. 1 is a schematic side view of an arrangement lever device in a rest state according to an embodiment of the present invention.

Referring to FIG. 1, there is illustrated an arrangement lever device according to the preferred embodiment of the present invention. An automobile seat to which the arrangement lever device is applied includes a seat cushion, a seat back pivotally supported on the seat cushion via first and second reclining lock means (not shown) arranged at both sides of the automobile seat, a slide rail mechanism for allowing the automobile seat to be slid in the vehicle body, and slide lock means (not shown) for locking the slide rail mechanism and preventing the slide movement of the automobile seat. The arrangement lever device includes a reclining operation lever 1 for unlocking the reclining lock means to allow the seat back to be angularly adjusted and pivoted forward and rearward relative to the seat cushion, a walk-in operation lever 2 for unlocking the reclining lock means to allow the seat back to be inclined forward and for unlocking the slide lock means for the slide rail mechanism, and a linkage mechanism for preventing the motion of one of the levers 1, 2 from being transmitted to the other of the levers 1, 2, the linkage mechanism being coupled between the levers 1, 2. The walk-in operation lever 2 is arranged to be adjacent to the reclining operation lever 1 and arranged at a position lower than the reclining operation lever 1. Both the reclining operation lever 1 and the walk-in operation lever 2 are arranged at one of the both sides of the automobile seat, extend in the forward/rearward direction in the vehicle body, and are adapted to be pulled up by a person.

Figure 2:
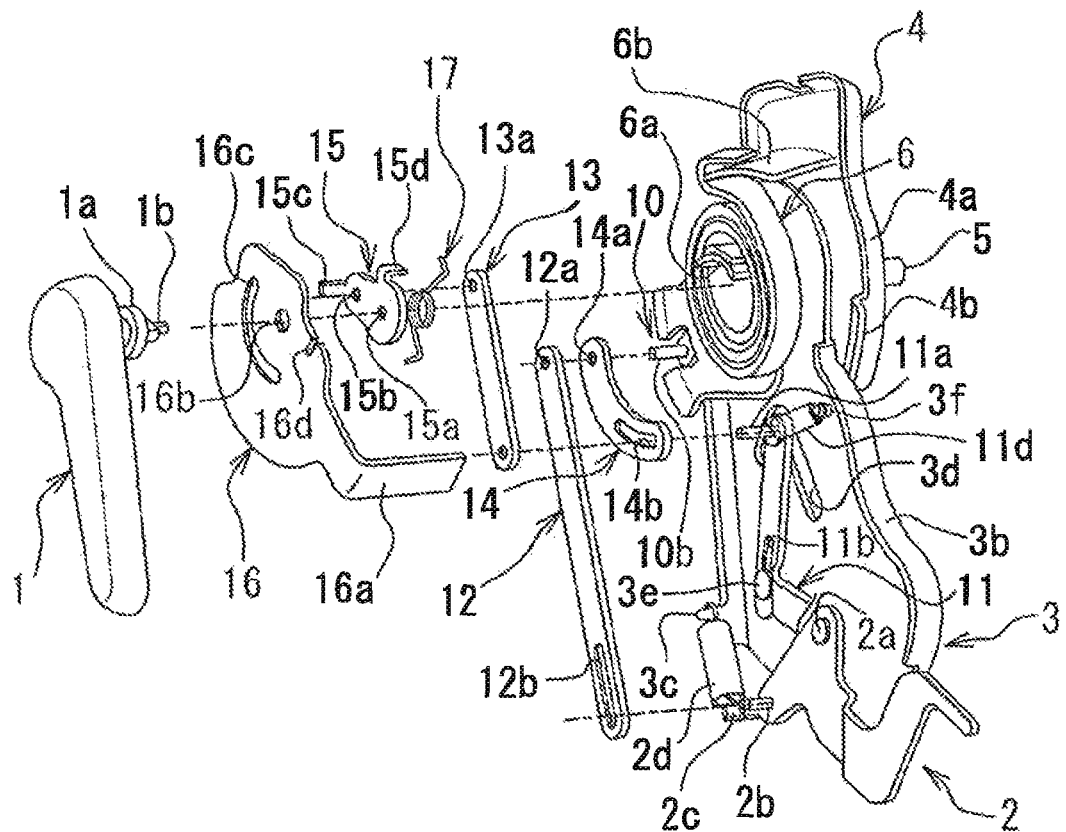
FIG. 2 is a schematic exploded perspective view of the arrangement lever device shown in FIG. 1.

The seat cushion includes a pair of spaced apart brackets (only one of the brackets of the seat cushion which is arranged on the side of the automobile seat at which the levers 1, 2 are arranged is shown and denoted with reference numeral 3 in FIGS. 1, 2, 4, 9 and 11). The seat back also includes a pair of spaced apart brackets (only one of the brackets of the seat back which is arranged on the side of automobile seat at which the levers 1, 2 are arranged is shown and denoted with reference numeral 4 in the Figures). Each of the first and second reclining lock means is arranged between a corresponding bracket of the seat cushion and a corresponding bracket of the seat back. An actuating shaft 5 for actuating the first and second reclining lock means interconnects the first and second reclining lock means. The reclining operation lever 1 is mounted on a support shaft 1a (FIG. 2) which is concentric with the actuating shaft 5. More particularly, as shown in FIG. 2, the reclining operation lever 1 has a longitudinal body which includes a base portion and the support shaft 1a provided at the base portion. The support shaft 1a has a tip end portion which constitutes a press-fit portion 1b. The actuating shaft 5 has an end surface facing the support shaft 1a of the reclining operation lever 1, and a receiving hole (not shown) formed in the end surface. The press-fit portion 1b of the support shaft 1a is press-fitted in the receiving hole of the actuating shaft 5, whereby an end surface of the press-fit portion 1b of the support shaft 1a is joined with the end surface of the actuating shaft 5.

The walk-in operation lever 2 has a longitudinal body which includes a supported portion curved upward at a substantially middle region of the longitudinal body of the lever 2, and a portion extending obliquely rearward and downward from the upward curved supported-portion. The walk-in operation lever 2 is pivotally supported at the upward curved supported-portion thereof on the bracket 3 of the seat cushion via a support pin 2a so as to be pivoted around the support pin 2a. A standing pin 2b is provided on an end of the obliquely rearward and downward extending portion of the walk-in operation lever 2. The standing pin 2*b* is movably inserted through an elongated hole 12*b* that is formed in a first link plate 12 of the linkage mechanism which will be discussed in greater detail hereinafter.

The pivotal movement of the walk-in operation lever 2 is adapted to be restricted by abutment of the obliquely rearward and downward extending portion of the walk-in operation lever 2 against a stopper piece 3*a* protruding from a lower edge of the bracket 3 of the seat cushion. Moreover, as shown in FIG. 2, a coil spring 2*d* is provided between a spring-retaining piece 2*c* rising up from an edge of the end of the obliquely rearward and downward extending portion of the walk-in operation lever 2, and a spring-retaining piece 3*c* rising up from a flange portion of the bracket 3 of the seat cushion, whereby the walk-in operation lever 2 is urged by the coil spring 2*d* so as to be returned to its original position.

The actuating shaft 5 interconnecting the first and second reclining lock means is supported by the brackets of the seat cushion and the brackets of the seat back. The brackets of the seat cushion are provided with spring-retaining pieces (only the spring-retaining piece of the bracket 3 is shown and denoted with reference numeral 6*a* in FIG. 2). The brackets of the seat back are also provided with spring-retaining pieces (only the spring-retaining piece of the bracket 4 is shown and denoted with reference numeral 6*b* in FIG. 2). A spiral spring 6 is stretched between each of the brackets of the seat cushion and each of the brackets of the seat back with an innermost end thereof being retained to the spring-retaining piece of the bracket of the seat cushion and with an outermost end thereof being retained to the spring-retaining piece of the bracket of the seat cushion, whereby the seat back can be pivoted forward about the actuating shaft 5 of the reclining lock means by the action of the spiral springs 6 (only one of the spiral springs 6 is shown in FIG. 2).

Figure 3:
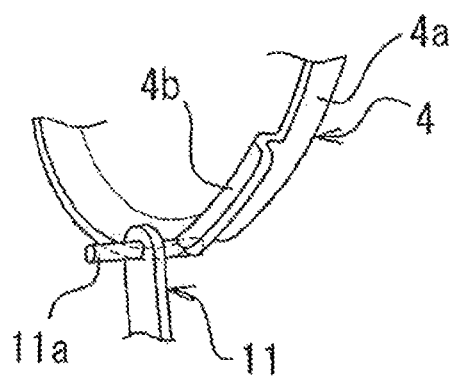
FIG. 3 is a schematic fragmentary perspective view showing a protruding piece of a bracket of a seat back and an induction pin which serve to restrict forward pivotal movement of the seat back.

The forward pivotal movement of the seat back by the action of the spiral springs 6 is adapted to be restricted by abutment of the spring-retaining pieces of the brackets of the seat back against rising-up flange portions of the brackets of the seat cushion (only the rising-up flange portion of the bracket 3 of the seat cushion is shown and denoted with reference numeral 3*b* in FIG. 2). Moreover, the forward pivotal movement of the seat back is also adapted to be angularly restricted by abutment of a protruding piece 4*b* (protruding outward from a rising-up flange portion 4*a* of the bracket 4 of the seat back as shown in FIG. 3) against one end portion of an induction pin 11*a* of a second swinging arm 11 of the linkage mechanism which will be discussed in greater detail hereinafter.

The linkage mechanism for preventing the motion of one of the levers 1, 2 from being transmitted to the other of the levers 1, 2 is arranged on the side of the automobile seat at which the levers 1, 2 are arranged. The linkage mechanism includes a first swinging arm 10 supported by the actuating shaft 5, the second swinging arm 11 briefly described above, the first link plate 12 briefly described above, a second link plate 13, a third link plate 14, a link bracket 15, and a retaining bracket 16.

Figure 4:
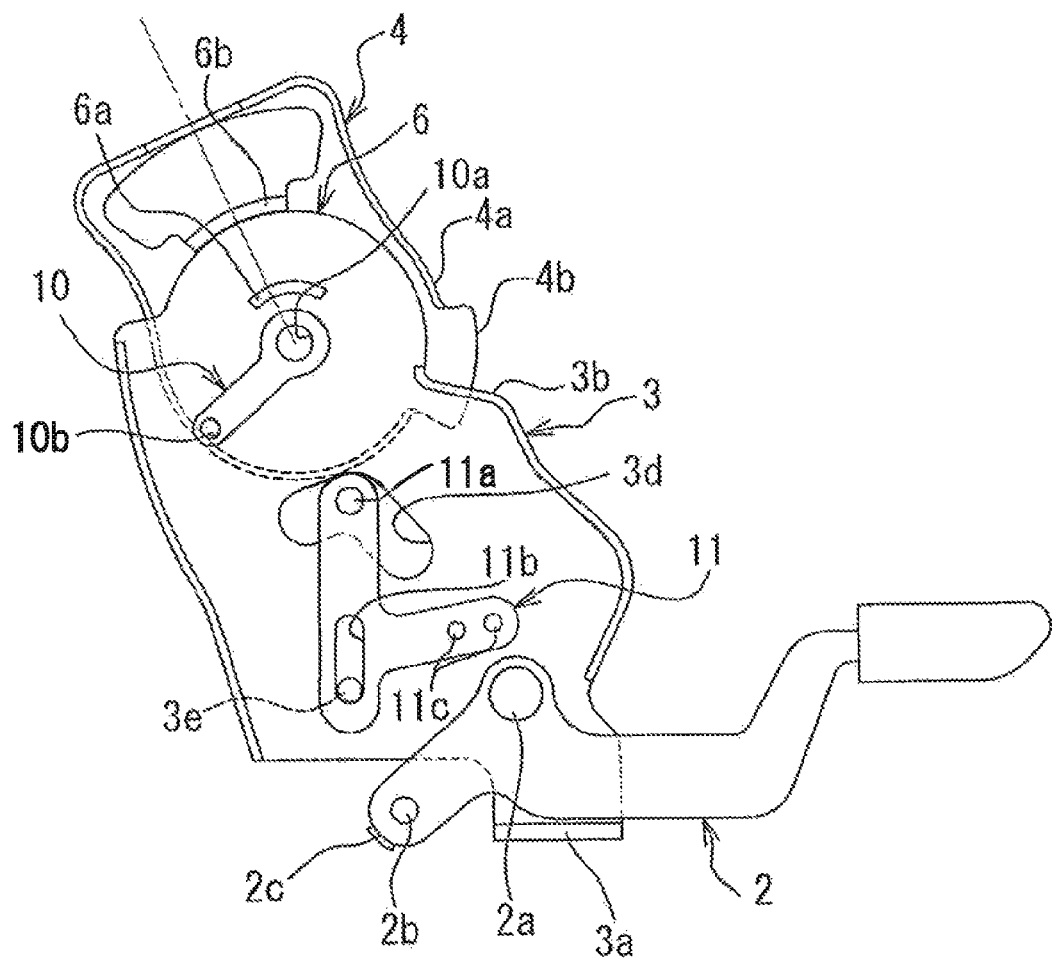
FIG. 4 is a schematic side view showing a bracket of a seat cushion to which first and second swinging arms that are elements of the arrangement lever device of FIG. 1 are applied.

Referring now to FIG. 4, the first swinging arm 10 has a longitudinal body which includes a base portion, a boss hole 10*a* formed in the base portion of the first swinging arm 10, and a support pin 10*b* provided at a rearward end of the longitudinal body of the first swinging arm 10. The first swinging arm 10 is mounted on the actuating shaft 5 with the boss hole 10*a* thereof being fitted over the actuating shaft 5.

The second swinging arm 11 has a body of a branch-shape in outline that includes a vertically extending arm portion and a laterally extending arm portion extending laterally from the vertically extending arm portion. The vertically extending arm portion of the second swinging arm 11 is provided with the induction pin 11*a* penetrating an upper end region of the vertically extending arm portion, and a vertically extending hole 11*b* formed in a lower end region of the vertically extending arm portion. The laterally extending portion of the second swinging arm 11 is formed with stop holes 11*c* in which an end portion of a wire cable 18 (see FIG. 1) extending to the slide lock means for the slide rail mechanism is retained.

The bracket 3 of the seat cushion has a guide hole 3*d* of a substantially L-shape formed therein and a support pin 3*e* provided thereon. The substantially L-shaped guide hole 3*d* of the bracket 3 includes an obliquely forward and downward extending portion, an obliquely rearward extending portion, and a middle bent-portion between the obliquely forward and downward extending portion and the obliquely rearward extending portion. The second swinging arm 11 is arranged on the bracket 3 with the one end portion of the induction pin 11*a* thereof being inserted through the guide hole 3*d* of the bracket 3 of the seat cushion so as to be stably guided along the substantially L-shaped guide hole 3*d*, and with the vertically extending hole 11*b* thereof receiving the support pin 3*e* of the bracket 3, so that the second swinging arm 11 can be stably swung about the support pin 3*e* in the forward/rearward direction while being guided by the substantially L-shaped guide hole 3*d* of the bracket 3.

The second swinging arm 11 is also adapted to be vertically moved while being supported by the support pin 3*e* received in the vertically extending hole 11*b* of the second swinging arm 11. Incidentally, the vertically extending hole 11*b* and the guide hole 3*d* may be omitted. In this case, the second swinging arm 11 is pivotally supported by the support pin 3*e* of the bracket 3 and, thus, the second swinging arm 11 can be also swung around the support pin 3*e*.

Figure 5:
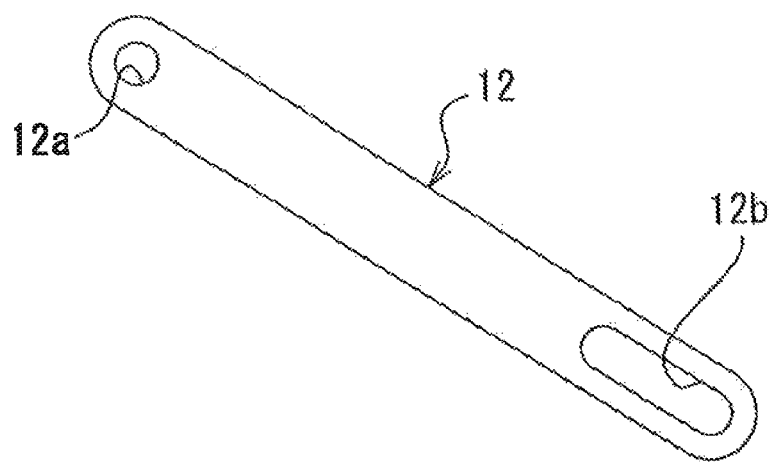
FIG. 5 is a schematic side view showing a first link plate that is one of elements making up the arrangement lever device of FIG. 1.

Referring now to FIG. 5, the first link plate 12 is formed as a linear plate extending longitudinally. The first link plate 12 has a circular hole 12*a* formed in an upper end portion thereof and the elongated hole 12*b* (briefly described above) formed in a lower end portion thereof. As shown in FIG. 1, the support pin 10*b* of the first swinging arm 10 is inserted through the circular hole 12*a* of the first link plate 12 and the standing pin 2*b* of the walk-in operation lever 2 is inserted through the elongated hole 12*b* of the first link plate 12, so that the first link plate 12 is coupled between the first swinging arm 10 and the walk-in operation lever 2.

Figure 6:
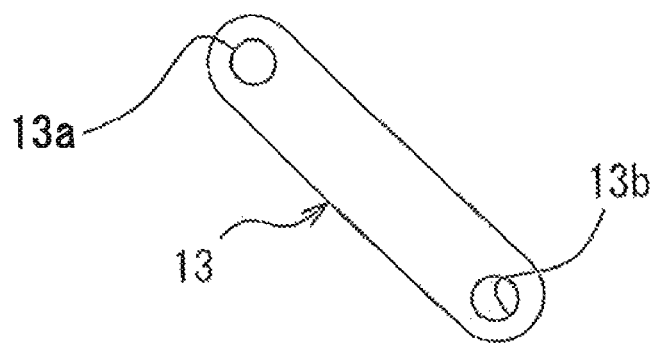
FIG. 6 is a schematic side view showing a second link plate that is one of the elements making up the arrangement lever device of FIG. 1.

Referring now to FIG. 6, the second link plate 13 is formed as a linear plate that extends longitudinally and is shorter than the first link plate 12. The second link plate 13 has a circular hole 13*a* formed in an upper end portion thereof and a circular hole 13*b* formed in a lower end portion thereof. As shown in FIG. 1, the upper end portion of the second link plate 13 is coupled to the link bracket 15 via a connection pin 13*c* penetrating through the circular hole 13*a* of the second link plate 13 and the induction pin 11*a* of the second swinging arm 11 is inserted through the circular hole 13*b* of the second link plate 13, so that the second link plate 13 is coupled between the second swinging arm 11 and the link bracket 15.

Figure 7:
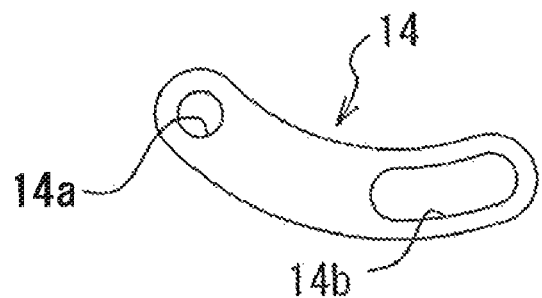
FIG. 7 is a schematic side view showing a third link plate that is one of the elements making up the arrangement lever device of FIG. 1.

Referring now to FIG. 7, the third link plate 14 is formed as a circular arc-shaped plate. The third link plate 14 has a circular hole 14*a* formed in one end portion thereof and a laterally extending hole 14*b* of a substantially ellipse-shape formed in the other end portion thereof. As shown in FIG. 1, the support pin 10*b* of the first swinging arm 10 is inserted through the circular hole 14*a* of the third link plate 14 and the induction pin 11*a* of the second swinging arm 11 is inserted through the ellipse-shaped hole 14*b* of the third link plate 14, so that the third link plate 14 is coupled between the first swinging arm 10 and the second swinging arm 11.

Figure 8:
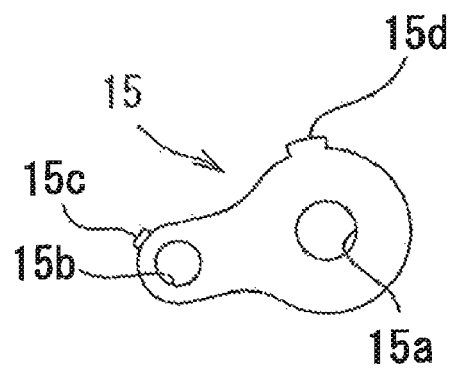
FIG. 8 is a schematic side view showing a link bracket that is one of the elements making up the arrangement lever device of FIG. 1.

Referring now to FIG. 8, the link bracket 15 has a body having a shape substantially resemblant to the first swinging arm 10 and smaller than the first swinging arm 10. The body of the link bracket 15 includes a tip end portion and a base portion having a through-hole 15a through which the press-fit portion 1b of the support shaft 1a of the reclining operation lever 1 is inserted. The tip end portion of the link bracket 15 has a through-hole 15b through which the connection pin 13c (FIG. 1) of the second link plate 13 is inserted. Thus, the link bracket 15 is coupled between the support shaft 1a concentrically joined with the actuating shaft 5 and the second link plate 13. Moreover, as shown in FIG. 2, the link bracket 15 is provided with a protruding piece 15c extending perpendicularly to the body of the link bracket 15 from an edge of the tip end portion of the body of the link bracket 15, and a spring-retaining piece 15d extending from an edge of an upper region of the base portion of the link bracket 15 in a direction opposite to the direction in which the protruding piece 15c extends.

The retaining bracket 16 serves to support the link bracket 15 and includes a plate-shaped body and a rising-up leg portion 16a of a substantially L-shape standing up from the plate-shaped body of the retaining bracket 6 as shown in FIG. 2. The retaining bracket 16 is fixedly mounted at the rising-up leg portion 16a thereof to the bracket 3 of the seat cushion.

Again referring to FIG. 2, the plate-shaped body of the retaining bracket 16 is formed with a through-hole 16b through which the press-fit portion 1b of the support pin 1a of the reclining operation lever 1 is inserted. In addition, the plate-shaped body of the retaining bracket 16 is formed with a circular arc-shaped hole 16c that is concentric with the actuating shaft 5. Moreover, the plate-shaped body of the retaining bracket 16 has a spring-retaining notch 16d formed in an upper edge region thereof.

The link bracket 15 is combined with the retaining bracket 16 by inserting the protruding piece 15c of the link bracket 15 through the circular arc-shaped hole 16c of the retaining bracket 16, so that the link bracket 15 is adapted to be stably pivoted along the circular arc-shaped hole 16c when the reclining operation lever 1 is pulled up. A return coil spring 17 is mounted at its coil portion around the press-fit portion 1b of the support pin 1a of the reclining operation lever 1 with one end thereof being retained to the spring-retaining piece 15d of the link bracket 15 and with the other end thereof being retained in the notch 16d of the retaining bracket 16, whereby the reclining operation lever 1 is urged by the return coil spring 17 so as to be capable of returning to its original position after the reclining operation lever 1 is released from the operated condition thereof.

In the arrangement lever device constructed as discussed above, when the seat back is in a sitting posture (FIG. 1), the induction pin 11a of the second swinging arm 11 is located at the middle bent-portion of the substantially L-shaped guide hole 3d of the bracket 3 of the seat cushion, and is maintained at the middle bent-portion of the substantially L-shaped guide hole 3d by the action of a coil spring 11d (FIG. 2) provided between the induction pin 11a of the second swinging arm 11 and a spring-retaining pin 3f (FIG. 2) standing up from the bracket 3 of the seat cushion as shown in FIG. 2. Thus, in the state where the seat back is in the sitting posture, the second swinging arm 11 is located with respect to the bracket 3 of the seat cushion with a lower end of the vertically extending hole 11b of the second swinging arm 11 being abutted against the support pin 3e of the bracket 3 of the seat cushion as shown in FIGS. 1 and 4.

Moreover, the first link plate 12 is located with respect to the walk-in operation lever 2 with a lower end of the elongated hole 12b of the first link plate 12 being abutted against the standing pin 2b of the walk-in operation lever 2. The third link plate 14 is located with respect to the second swinging arm 11 with a forward end of the laterally extending hole 14b of the third link plate 14 being abutted against the induction pin 11a of the second swinging arm 11.

Figure 9:
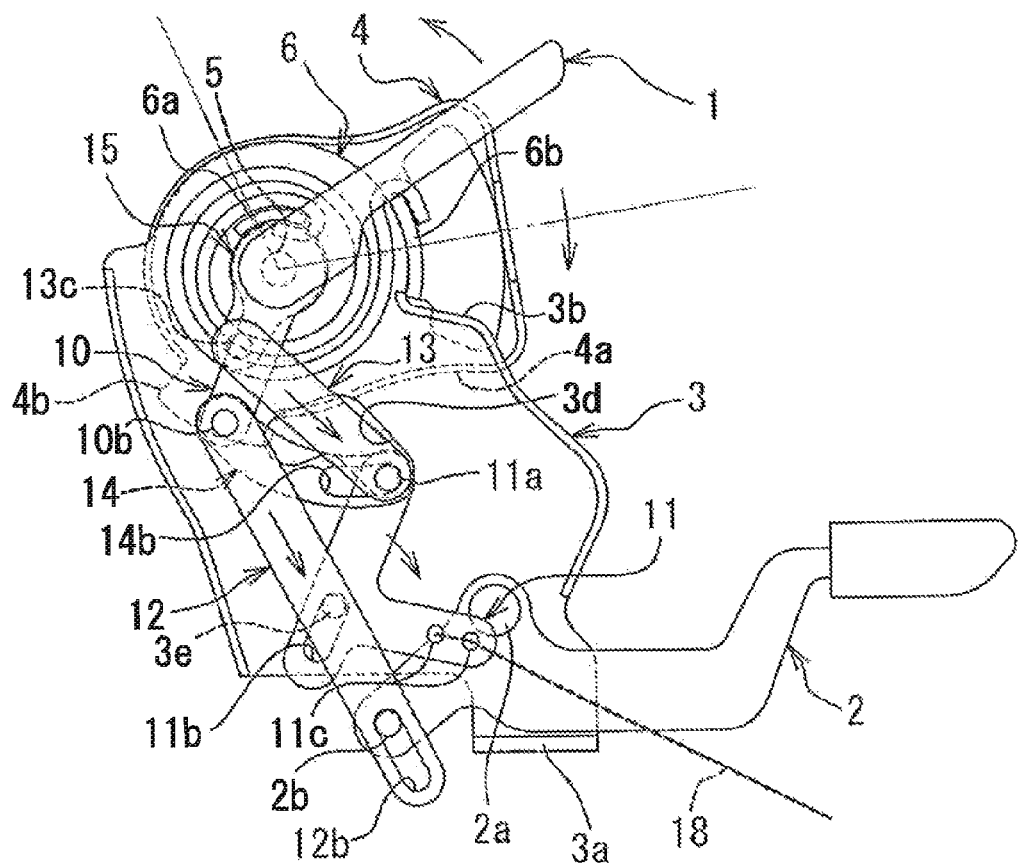
FIG. 9 is a schematic side view showing the arrangement lever device of FIG. 1, in a state where a reclining operation lever is pulled up.

In the state where the seat back is in the sitting posture, when the reclining operation lever 1 is pulled upward as shown in FIG. 9, the actuating shaft 5 is rotated, whereby the reclining lock means are unlocked, the brackets of the seat back are pivoted forward by the action of the spiral springs 6 (only one of the spiral springs 6 is shown in FIG. 9), and the seat back is pivoted forward. At this time, downward movement of the second link plate 13 causes the induction pin 11a of the second swinging arm 11 to be shifted from the middle bent-portion of the substantially L-shaped guide hole 3d of the bracket 3 toward the obliquely forward and downward extending portion of the substantially L-shaped guide hole 3d of the bracket 3, so that the induction pin 11a is not abutted against the protruding piece 4b of the bracket 4 of the seat back. Thus, the pivotal movement of the seat back is restricted by only the abutment of the spring-retaining pieces of the brackets of the seat back (only the spring-retaining piece 6b of the bracket 4 of the seat back is shown in FIG. 9) against the rising-up flange portions of the brackets of the seat cushion as shown in FIG. 9 (only the rising-up flange portion 3b of the bracket 3 of the seat back is shown in FIG. 9).

According to the operation of the reclining operation lever 1, the first swinging arm 10 is pivoted to thereby cause the first link plate 12 to be moved downward in such a manner that the vertically extending hole 12b of the first link plate 12 is shifted relative to the standing plate 2b of the walk-in operation lever 2. Thus, the first link plate 12 is idled relative to the walk-in operation lever 2 and the operation of the reclining operation lever 1 is not transmitted to the walk-in operation lever 2.

Moreover, the link bracket 15 is pivoted and the second link plate 13 coupled to the link bracket 15 is moved downward as discussed above, whereby the second swinging arm 11 is swung in a forward direction, namely, in a direction in which the wire cable 18 is not pulled, in such a manner that the induction pin 11a in the state of being abutted against the forward end of the laterally extending hole 14b of the third link plate 14 is allowed to be moved relative to the bracket 3 from the middle bent-portion of the substantially L-shaped guide hole 3d of the bracket 3 toward the obliquely forward and downward extending portion of the substantially L-shaped guide hole 3d. Thus, the slide lock means for the slide rail mechanism is not actuated for unlocking of the slide lock means.

Figure 10:
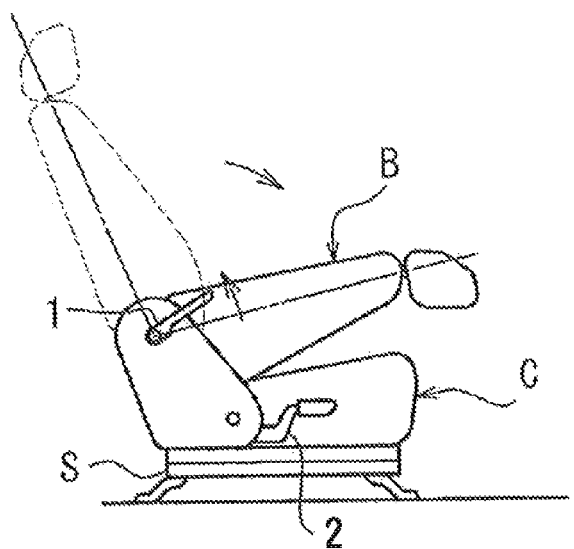
FIG. 10 is a schematic side view showing the entire automobile seat employing the arrangement lever device of FIG. 1, in which the reclining operation lever is pulled up.

In summary, in the state where the seat back B is in the sitting posture shown by a broken-line in FIG. 10, when the reclining operation lever 1 is pulled up, the seat back B is pivoted forward relative to the seat cushion C as shown by a solid line in FIG. 10. At this time, the operation of the reclining operation lever 1 is not transmitted to the walk-in operation lever 2 as discussed above, so that the walk-in operation lever 2 is not swingingly moved. In addition, the slide lock means for the slide rail mechanism S is not actuated for the unlocking of the slide lock means as discussed above, so that the slide rail mechanism S is not brought into a state where it allows the automobile seat to be slid.

Figure 11:
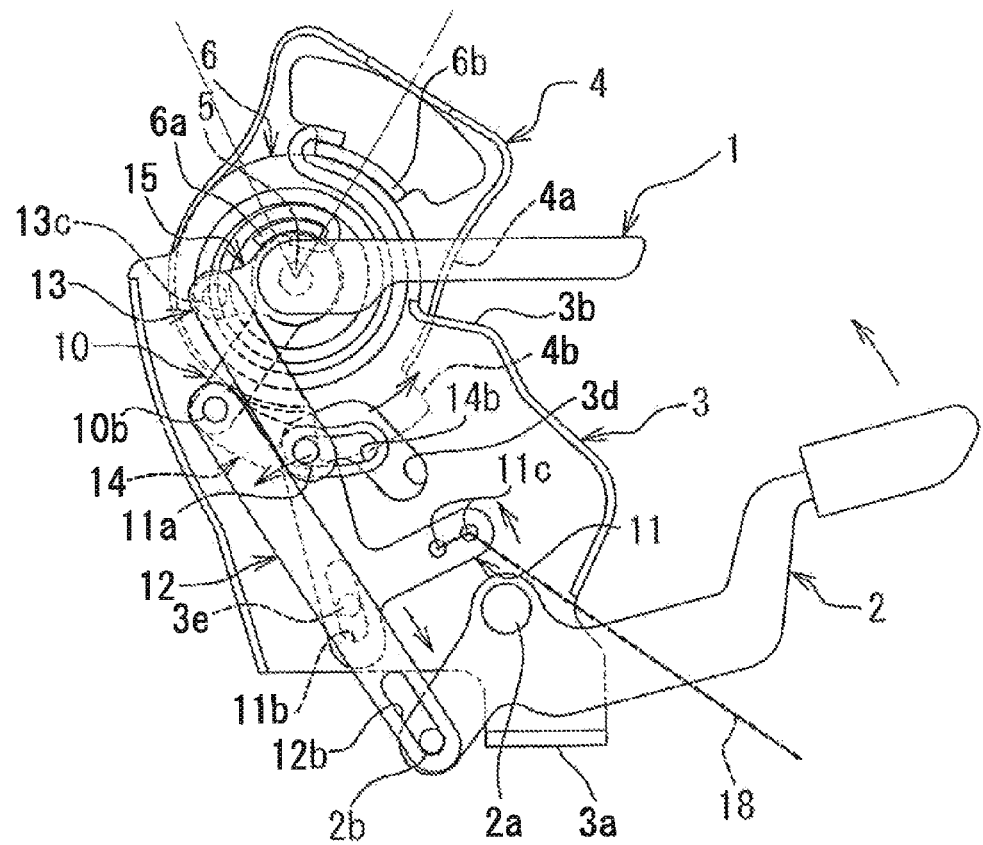
FIG. 11 is a schematic side view showing the arrangement lever device of FIG. 1, in a state where a walk-in operation lever is pulled up.

In the state where the seat back is in the sitting posture, when the walk-in operation lever 2 is pulled up as shown in FIG. 11, the first link plate 12 is pulled downward to thereby cause the first swinging arm 10 to be swung while allowing the third link plate 14 to be moved relative to the induction pin 11a of the second swinging arm 11 in such a manner that a rearward end portion of the laterally extending hole 14b of the third link plate 14 receive the induction pin 11a as shown in FIG. 11. By the swinging movement of the first swinging arm 10, the reclining lock means are unlocked and the brackets of the seat back are pivoted forward by the action of the spiral springs 6, whereby the seat back B is pivoted forward. As discussed above, when the first link plate 12 is pulled downward, the third link plate 14 is moved relative to the induction pin 11a of the second swinging arm 11 in such a manner that the rearward end portion of the laterally extending hole 14b of the third link plate 14 receive the induction pin 11a. Therefore, when the seat back is pivoted forward, the protruding piece 4b of the bracket 4 of the seat back is abutted against the induction pin 11a of the second swinging arm 11, whereby the seat back B is maintained to be inclined at a predetermined angle as shown by a solid line in FIG. 12.

When the third link plate 14 is moved relative to the induction pin 11a of the second swinging arm 11 as discussed above and the protruding piece 4b of the bracket 4 of the seat back is abutted against the induction pin 11a, the induction pin 11a is shifted from the middle bent-portion of the substantially L-shaped guide hole 3d of the bracket 3 of the seat cushion to the obliquely rearward extending portion of the substantially L-shaped guide hole 3d of the bracket 3, whereby the second swinging arm 11 is pivoted in a rearward direction, namely, in a direction in which the wire cable 18 is pulled. By the pulling of the wire cable 18, the slide lock means for the slide rail mechanism is unlocked. The downward movement of the first link plate 12 by the pulling operation of the walk-in operation lever 2 is converted into the movement of the third link plate 14 relative to the induction pin 11a of the second swinging arm 11. Therefore, force which is produced by the pulling-up operation of the walk-in operation lever 2 and then transmitted to the third link plate 14 through the first link plate 12 is idly consumed by the movement of the third link plate 14 relative to the induction pin 11a of the second swinging arm 11, so that the operation of the walk-in operation lever 2 is not transmitted to the reclining operation lever 1.

Figure 12:
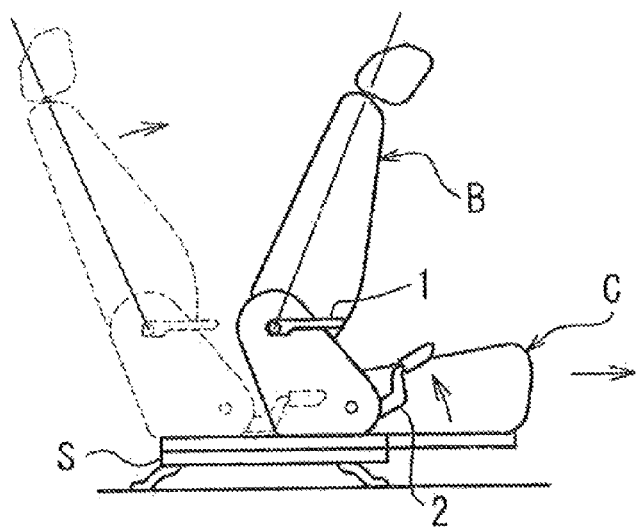
FIG. 12 is a schematic side view showing the entire automobile seat in which the walk-in operation lever is pulled up.

In summary, in the state where the seat back B is in the sitting posture as shown by a broken-line in FIG. 12, when the walk-in operation lever 2 is pulled up, the reclining lock means are unlocked and the seat back B is pivoted forward relative to the seat cushion C and is maintained to be inclined at the predetermined angle as shown in the solid line in FIG. 12. Moreover, the slide lock means for the slide rail mechanism S is unlocked, so that the vehicle seat is brought into the state where it can be slide forward via the slide rail mechanism S. In addition, the operation of the walk-in operation lever 2 is not transmitted to the reclining lock lever 1, so that the reclining operation lever is not swingingly moved.

As discussed above, the reclining operation lever 1 is mounted to the support shaft 1a that is concentrically joined with the actuating shaft 5 interconnecting the reclining lock means that are arranged between the brackets of the seat cushion and the bracket of the seat back, and the walk-in operation lever 2 is arranged to be adjacent to the reclining operation lever 1 and is pivotally supported on the bracket 3 of the seat cushion, so that the reclining operation lever 1 and the walk-in operation lever 2 become easy to be found.

Moreover, the linkage mechanism for preventing the motion of one of the levers 1, 2 from being transmitted to the other of the levers 1, 2 is coupled between the levers 1, 2, so that with the simple linkage mechanism, one of the levers 1, 2 which is in the unused state is prevented from being swingingly moved according to the operation of the other lever in the used state and the operation of the other lever in the used state is not interrupted with the lever in the unused state, thus providing the arrangement lever device that is convenient to be handled.

In addition, the link bracket 15 is combined with the retaining bracket 16 so as to be pivoted relative to the retaining bracket 16, so that the second link plate 13 coupled to the link bracket 15 can be stably and smoothly operated by the link bracket 15, and the second swinging arm 11 can be also stably and smoothly operated by the second link plate 13. Moreover, the return coil spring 17 is stretched between the link bracket 15 and the retaining bracket 16, whereby the reclining operation lever 1 is adapted to be returned to its original position by the return coil spring 17 after the reclining operation lever 1 is released from the operated state, thus making it possible to provide the reclining operation lever 1 that is convenient to be handled.

Moreover, the bracket 3 of the seat cushion has the substantially L-shaped guide hole 3d through which the induction pin 11a of the second swinging arm 11 is inserted and which allows the second swinging arm 11 to be swung forward and rearward while allowing the induction pin 11a thereof being guided along the guide hole 3d of the bracket 3 of the seat cushion, so that the second swinging arm 11 can be stably swung on the bracket 3 of the seat cushion, and the slide lock means for the slide rail mechanism can be smoothly unlocked by the wire cable 18 which is pulled by the smooth swinging movement of the second swinging arm 11.

As discussed above, the second swinging arm 11 has the vertically extending hole 11b, the support pin 3e for supporting the second swinging arm 11 so as to allow the second swinging arm 11 to be pivoted is provided on the bracket 3 of the seat cushion, and the second swinging arm 11 is arranged with the vertically extending hole 11b thereof receiving the support pin 3e of the bracket 3 and with the induction pin 11a thereof being inserted through the substantially L-shaped guide hole 3d of the bracket 3 of the seat cushion. At the initial state, the second swinging arm 11 is located with respect to the bracket 3 of the seat cushion with the induction pin 11a thereof being located at the middle bent-portion of the substantially L-shaped guide hole 3d of the bracket 3 and with the lower end portion of the vertically extending hole 11b thereof being abutted against the support pin 3e of the bracket 3 of the seat cushion. Therefore, when the levers 1, 2 are operated, the second swinging arm 11 can be positively and smoothly swung in the forward/rearward direction while being guided by the substantially L-shaped guide hole 3d of the bracket 3 of the seat cushion and supported by the support pin 3e of the bracket 3 of the seat cushion.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An arrangement lever device for an automobile seat, the automobile seat including a seat cushion having a pair of spaced apart brackets and pivotally supported to the seat cushion via first and second reclining lock means arranged between the brackets of the seat cushion and the brackets of the seat back, an actuating shaft for actuating the first and second lock means, the actuating shaft interconnecting the first and second locking means, a slide rail mechanism for allowing the automobile seat to be slid in a vehicle body, and slide lock means for locking the slide rail mechanism and preventing the slide movement of the automobile seat, the arrangement lever device comprising:

a reclining operation lever for unlocking the first and second reclining lock means to allow the seat back to be angularly adjusted and pivoted forward and rearward relative to the seat cushion;

the reclining operation lever being mounted on a support shaft that is concentrically joined with the actuating shaft;

a walk-in operation lever for unlocking the first and second reclining lock means to allow the seat back to be inclined forward and for unlocking the slide lock means for the slide rail mechanism;

the walk-in operation lever being arranged to be adjacent to the reclining operation lever and pivotally supported on one of the brackets of the seat cushion; and a linkage mechanism for preventing the motion of one of the reclining operation and walk-in operation levers from being transmitted to the other of the levers;

the linkage mechanism coupled between the reclining operation lever and the walk-in operation lever.

2. The arrangement lever device according to claim 1, wherein the walk-in operation lever is provided at a rearward end portion thereof with a standing pin, wherein the linkage mechanism includes a first swinging bar supported by the actuating shaft, a link bracket supported on the support shaft, a second swinging arm pivotally supported on the bracket of the seat cushion and coupled to the slide lock means for the slide rail mechanism via a wire cable, the second swinging arm being provided at an upper end portion thereof with an induction pin, a first link plate having an elongated hole formed in a lower end portion thereof, the first link plate being coupled at an upper end portion thereof to the first swinging arm with the elongated hole thereof receiving the standing pin of the walk-in operation lever, so that the first link plate is coupled between the first swinging arm and the walk-in operation lever, and a second link plate coupled at an upper end portion thereof to the link bracket and coupled at a lower end portion thereof to the induction pin of the second swinging arm, so that the second link plate is coupled between the link bracket and the second swinging arm, and wherein when the reclining operation lever is operated, the actuating shaft is rotated to thereby cause the first and second reclining lock means to be unlocked, the first swinging arm is swung to thereby cause the first link plate to be moved relative to the walk-in operation lever while allowing the elongated hole thereof to be shifted relative to the standing pin of the walk-in operation lever, and the second link plate is moved to thereby cause the second swinging lever to be pivoted in a direction in which the wire cable is not pulled, so that the operation of the reclining operation lever is idled by the movement of the first link plate relative to the walk-in operation lever while allowing the elongated hole thereof to be shifted relative to the standing pin of the walk-in operation lever, and is not transmitted to the walk-in operation lever.

3. The arrangement lever device according claim 2, wherein the linkage mechanism further includes a third link plate having a laterally extending hole formed in one end portion thereof, the third link plate being coupled at the other end portion to the first swinging arm with the laterally extending hole thereof receiving the induction pin of the second swinging arm, so that the third link plate is coupled between the first swinging arm and the second swinging arm, and wherein when the walk-in operation lever is operated, the first link plate is pulled downward to thereby cause the first swinging arm to be swung while allowing the third link plate to be moved in such a manner that the laterally extending hole thereof is shifted relative to the induction pin of the second swinging arm, and the second swinging arm is swung in a direction in which the wire cable is pulled, so that the operation of the walk-in operation lever is idled by the movement of the third link plate in such a manner that the laterally extending hole thereof is shifted relative to the induction pin of the second swinging arm, and is not transmitted to the reclining operation lever.

4. The arrangement lever device according to claim 2 or 3, wherein the linkage mechanism further includes a retaining bracket for supporting the link bracket, the retaining bracket having a circular arc-shaped hole concentric with the actuating shaft, and the retaining bracket being mounted on the support shaft and mounted to the bracket of the seat cushion, and wherein the link bracket is provided with a protruding piece extending perpendicularly thereto, the link bracket being pivotally supported on the support shaft with the protruding piece thereof being inserted through the circular arc-shaped hole of the retaining bracket, and wherein a return coil spring is stretched between the link bracket and the retaining bracket, so that the reclining operation lever is urged by the return coil spring so as to be returned to its original position after the reclining operation lever is released from the operated condition thereof.

5. The arrangement lever device according to claim 4, wherein the bracket of the seat cushion has a substantially L-shaped guide hole for guiding the induction pin of the second swinging arm, and a support pin provided thereon, and the second swinging arm has a vertically extending hole, the second swinging arm being pivotally supported on the bracket with the induction pin thereof being inserted through the substantially L-shaped guide hole of the bracket of the seat back and with the vertically extending hole thereof receiving the support pin of the bracket of the seat cushion, and the second swinging arm being adapted to be located relative to the bracket of the seat cushion at an initial state in such a manner that the induction pin thereof is located at a middle bent-portion of the substantially L-shaped guide hole of the bracket of the seat cushion and a lower end portion of the vertically extending hole thereof is abutted against the support pin of the bracket of the seat cushion, wherein when the reclining operation lever and the walk-in operation lever are operated, the second swinging arm is swung forward and rearward while being guided along the substantially L-shaped guide hole of the bracket of the seat cushion.

6. The arrangement lever device according to claim 3, wherein the bracket of the seat cushion has a substantially L-shaped guide hole for guiding the induction pin of the second swinging arm, and a support pin provided thereon, and the second swinging arm has a vertically extending hole, the second swinging arm being pivotally supported on the bracket with the induction pin thereof being inserted through the substantially L-shaped guide hole of the bracket of the seat back and with the vertically extending hole thereof receiving the support pin of the bracket of the seat cushion, and the second swinging arm being adapted to be located relative to the bracket of the seat cushion at an initial state in such a manner that the induction pin thereof is located at a middle bent-portion of the substantially L-shaped guide hole of the bracket of the seat cushion and a lower end portion of the vertically extending hole thereof is abutted against the support pin of the bracket of the seat cushion, wherein when the reclining operation lever and the walk-in operation lever are operated, the second swinging arm is swung forward and rearward while being guided along the substantially L-shaped guide hole of the bracket of the seat cushion.

7. The arrangement lever device according to claim 2, wherein the bracket of the seat cushion has a substantially L-shaped guide hole for guiding the induction pin of the second swinging arm, and a support pin provided thereon, and the second swinging arm has a vertically extending hole, the second swinging arm being pivotally supported on the bracket with the induction pin thereof being inserted through the substantially L-shaped guide hole of the bracket of the seat back and with the vertically extending hole thereof receiving the support pin of the bracket of the seat cushion, and the second swinging arm being adapted to be located relative to the bracket of the seat cushion at an initial state in such a manner that the induction pin thereof is located at a middle bent-portion of the substantially L-shaped guide hole of the bracket of the seat cushion and a lower end portion of the vertically extending hole thereof is abutted against the support pin of the bracket of the seat cushion, wherein when the reclining operation lever and the walk-in operation lever are operated, the second swinging arm is swung forward and rearward while being guided along the substantially L-shaped guide hole of the bracket of the seat cushion.

\* \* \* \* \*